(12) United States Patent
Yang

(10) Patent No.: US 8,065,719 B2
(45) Date of Patent: *Nov. 22, 2011

(54) METHOD AND APPARATUS FOR REDUCING FIREWALL RULES

(75) Inventor: James H. Yang, Longwood, FL (US)

(73) Assignee: AT&T Intellectual Property II, L.P., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/647,481

(22) Filed: Dec. 26, 2009

(65) Prior Publication Data

US 2010/0100954 A1   Apr. 22, 2010

Related U.S. Application Data

(63) Continuation of application No. 11/291,005, filed on Nov. 30, 2005, now Pat. No. 7,665,128.

(60) Provisional application No. 60/669,508, filed on Apr. 8, 2005.

(51) Int. Cl.
*G06F 9/00* (2006.01)
*G06F 11/00* (2006.01)

(52) U.S. Cl. .......................... 726/11; 726/22

(58) Field of Classification Search .......... 726/1–3, 726/11–15, 22–25; 713/150–154
See application file for complete search history.

(56) References Cited

U.S. PATENT DOCUMENTS

| | | | |
|---|---|---|---|
| 6,076,168 A | 6/2000 | Fiveash | |
| 6,496,935 B1 | 12/2002 | Fink et al. | |
| 7,028,336 B2 | 4/2006 | Wesinger et al. | |
| 7,665,128 B2* | 2/2010 | Yang | 726/11 |
| 2005/0149721 A1* | 7/2005 | Lu | 713/154 |

FOREIGN PATENT DOCUMENTS

EP    0910197 A    4/1999

OTHER PUBLICATIONS

EP Search Report for European Patent Application No. 06112441.8; mailing date Jul. 28, 2006; copy consists of 9 unnumbered pages.

Lee, T.K., et al., "Compiling Policy Descriptions Into Reconfigurable Firewall Processors," Field-Programmable Custom Computing Machines, 2003. FCCM 2003. 11$^{th}$ Annual IEEE Symposium in Apr. 9-11, 2003, Piscataway, NJ, USA, IEEE, Apr. 9, 2003 copy consists of 10 unnumbered pages.

Dersingh, A., et al. "Managing Access Control for Presence-Based Services," Communication Networks and Services Research Conference, 2005. Proceedings of the 3$^{rd}$ Annual Communication Networks and Services Research Conference (CNSR'05), Halifax, NS, Canada May 16-18, 2005, Piscataway, NJ, USA, IEEE, May 16, 2005, copy consists of 7 unnumbered pages.

* cited by examiner

*Primary Examiner* — Hosuk Song

(57) ABSTRACT

A method and apparatus for reducing obsolete firewall rules are disclosed. The present invention addresses the issue by using existing network routing information as well as firewall rule configuration information to help analyze firewall access logs to identify obsolete and unused firewall rules so that these obsolete firewall rules can be removed. In one embodiment, the present invention is capable of periodically identifying the unused rule set for each external partner network and removing these obsolete rules with no impact to the current operation.

6 Claims, 4 Drawing Sheets

400

METHOD AND APPARATUS FOR REDUCING FIREWALL RULES

This application is a continuation of U.S. patent application Ser. No. 11/291,005, filed Nov. 30, 2005, now U.S. Pat. No. 7,665,128 which is currently allowed, and claims the benefit of U.S. Provisional Application No. 60/669,508 filed on Apr. 8, 2005; both of which are herein incorporated by reference in their entirety.

The present invention relates generally to communication networks and, more particularly, to a method and apparatus for firewall rules reduction in packet networks, e.g., Internet Protocol (IP) networks.

BACKGROUND OF THE INVENTION

Firewalls that govern the corporate network security often have too many rules implemented because unused and obsolete rules that are no longer needed may remain in the firewall system and cannot be removed automatically. Removal of obsolete firewall rules involves complex manual analytical processes depending on the size of the rule set and the traffic volume. In a large firewall implementation, the obsolete rules create performance issues that have impact to network accessibilities as well as security issues that can potentially allow unauthorized accesses. The firewall generates access logs, which has the rule identification (ID) information. However, the firewall rules are subject to change on an on-going basis and the associated rule IDs are changed as well every time the rules are modified. This behavior makes it almost impossible to identify unused rules using the associated rule ID information.

Therefore, a need exists for a method and apparatus for reducing firewall rules in Internet Protocol (IP) networks.

SUMMARY OF THE INVENTION

In one embodiment, the present invention resolves the obsolete firewall rules issue. For example, the present invention addresses the issue by using existing network routing information as well as firewall rule configuration information to help analyze firewall access logs to identify obsolete and unused firewall rules so that these obsolete firewall rules can be removed. In one embodiment, the present invention is capable of periodically identifying the unused rule set for each external partner network and removing these obsolete rules with no impact to the current operation.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

A firewall system is a set of related software programs located within one or more network gateway servers and/or one or more routers that protect the access to resources of a private network from users of other external networks. Basically, a firewall filters all packets in both directions, incoming or outgoing, to determine whether to forward them toward their destination. A firewall is often installed between the private network and other external networks so that no incoming request can directly access resources located within the private network. A firewall system serves as a security checkpoint between any connected external networks and the private network. A firewall system uses access lists to ensure the security of the private network. Access lists are configuration entries, rules, in the firewall system that provides allowable access attributes that determine whether a particular packet can flow into or out of the private network. These attributes include, but are not limited to, source IP address, destination IP address, protocol used (e.g. TCP or UDP etc), protocol port number, direction (e.g. incoming or outgoing) etc.

Figure 1:
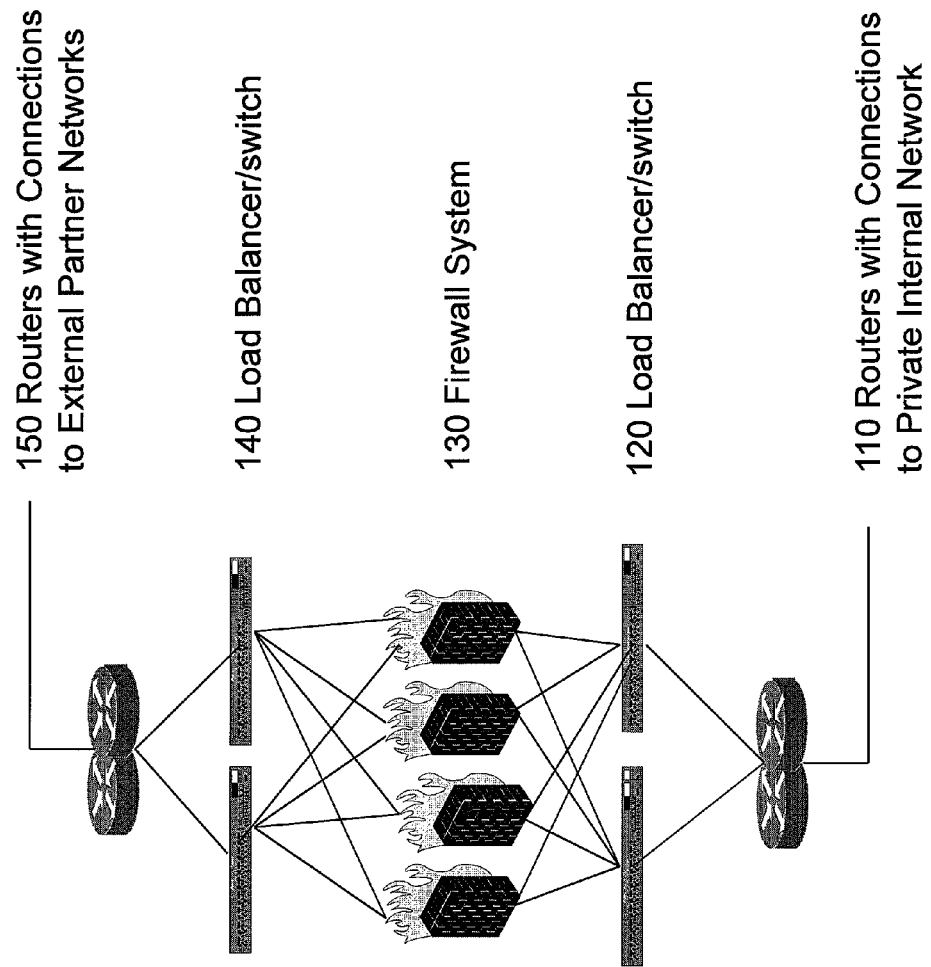
FIG. 1 illustrates an exemplary firewall system related to the present invention.

FIG. 1 illustrates an exemplary firewall system comprising one or more routers 110, one or more load balancers 120, a firewall system 130 having one or more firewall servers, one or more load balancers 140, and one or more routers 150. In one embodiment, router 110 provides IP connectivity to the internal private network that is protected by the firewall system 130. Load balancer 120 supports load balancing function that spreads processing load evenly among the different firewall servers within firewall system 130. Firewall system 130 comprises one or more firewall servers that provide firewall functions. Load balancer 140 also supports load balancing function that spreads processing load evenly among the different firewall servers within the firewall system. Router 150 provides IP connectivity to the external partner networks that firewall system 130 is trying to protect from. Note that load balancers 120 and 140 as well as routers 110 and 150 are shown in redundant configurations for enhanced reliability purposes only.

Figure 2:
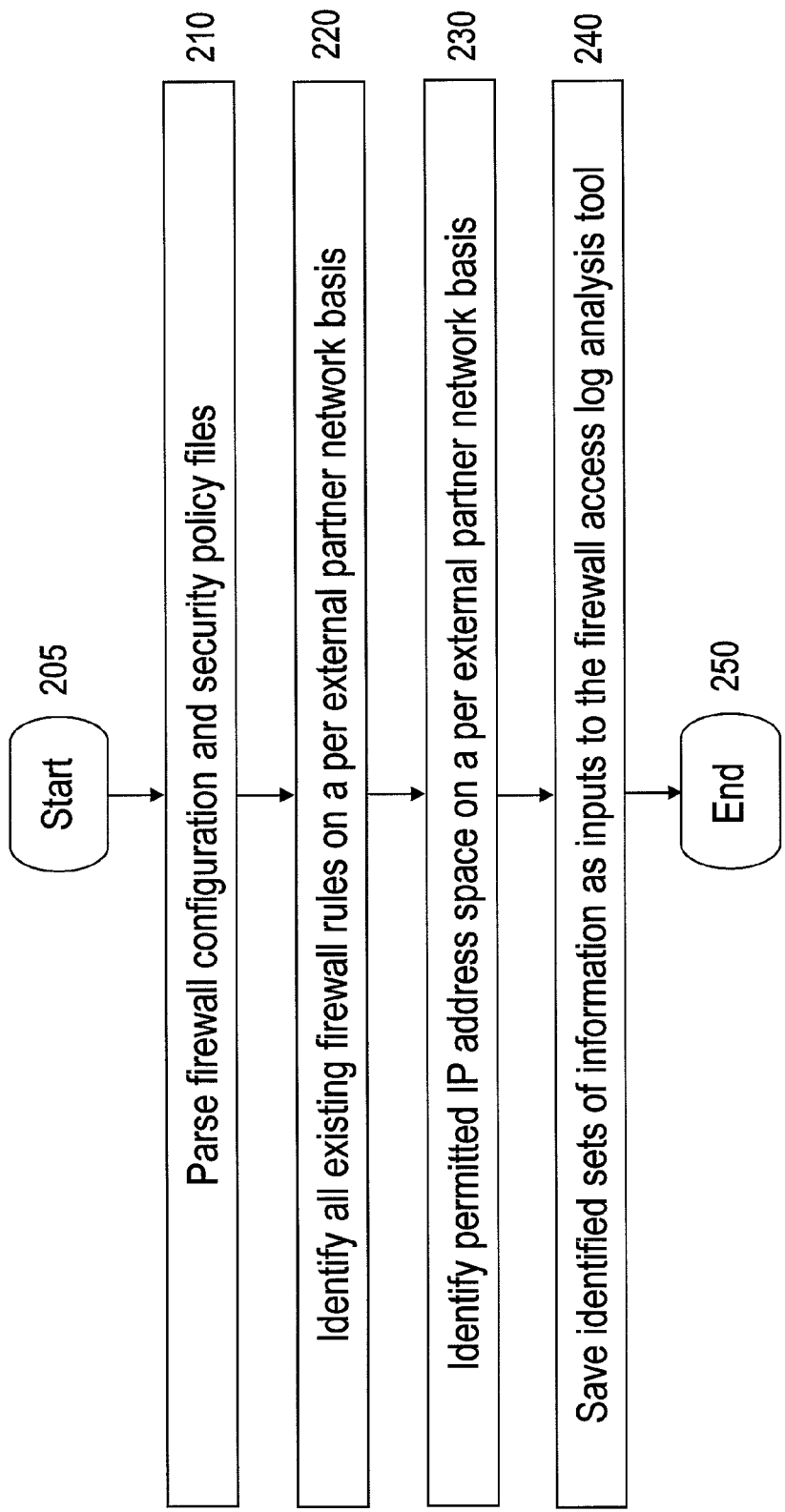
FIG. 2 illustrates a flowchart of a method for parsing firewall configuration and security policy files to enable firewall rule reduction of the present invention.

FIG. 2 illustrates a flowchart of an exemplary method 200 for parsing firewall configuration and security policy files to enable firewall rule reduction. Method 200 starts in step 205 and proceeds to step 210.

In step 210, the method parses one or more firewall system configuration and security policy files (broadly defined as a firewall configuration file).

In step 220, the method uses the parsed information to identify all existing firewall rules on a per external partner network basis. In other words, the method identifies, for each external partner network, its routable network address space and all the existing firewall rules associated with that particular external partner network. Firewall rule may comprise attributes that includes, but are not limited to, source IP address, destination IP address, protocol used (e.g., TCP or UDP, etc), protocol port number, direction (e.g., incoming or outgoing) etc.

In step 230, the method uses the parsed information to identify the permitted IP address space on a per external partner network basis. In other words, the method identifies, for each external partner network, all the valid IP source and destination addresses permitted for access by that particular external partner network. Special considerations are taken if Network Address Translation (NAT) is performed for external partner networks that use private IP addresses. Network Address Translation is the translation of an IP address used within one network to a different IP address known within another network. One network is designated the internal network and the other is the external network. Typically, a network maps its local internal network addresses to one or more global external IP addresses and un-maps the global IP addresses on incoming packets back into internal local IP addresses. This helps ensure security since each outgoing or incoming request must go through a translation process that also offers the opportunity to qualify or authenticate the request or match it to a previous request. NAT also conserves on the number of global IP addresses that a network needs and it lets the network use a single IP address in its communication with the world.

In step 240, the method saves the identified information set to be used as index in conjunction with method 300 described hereafter.

Figure 3:
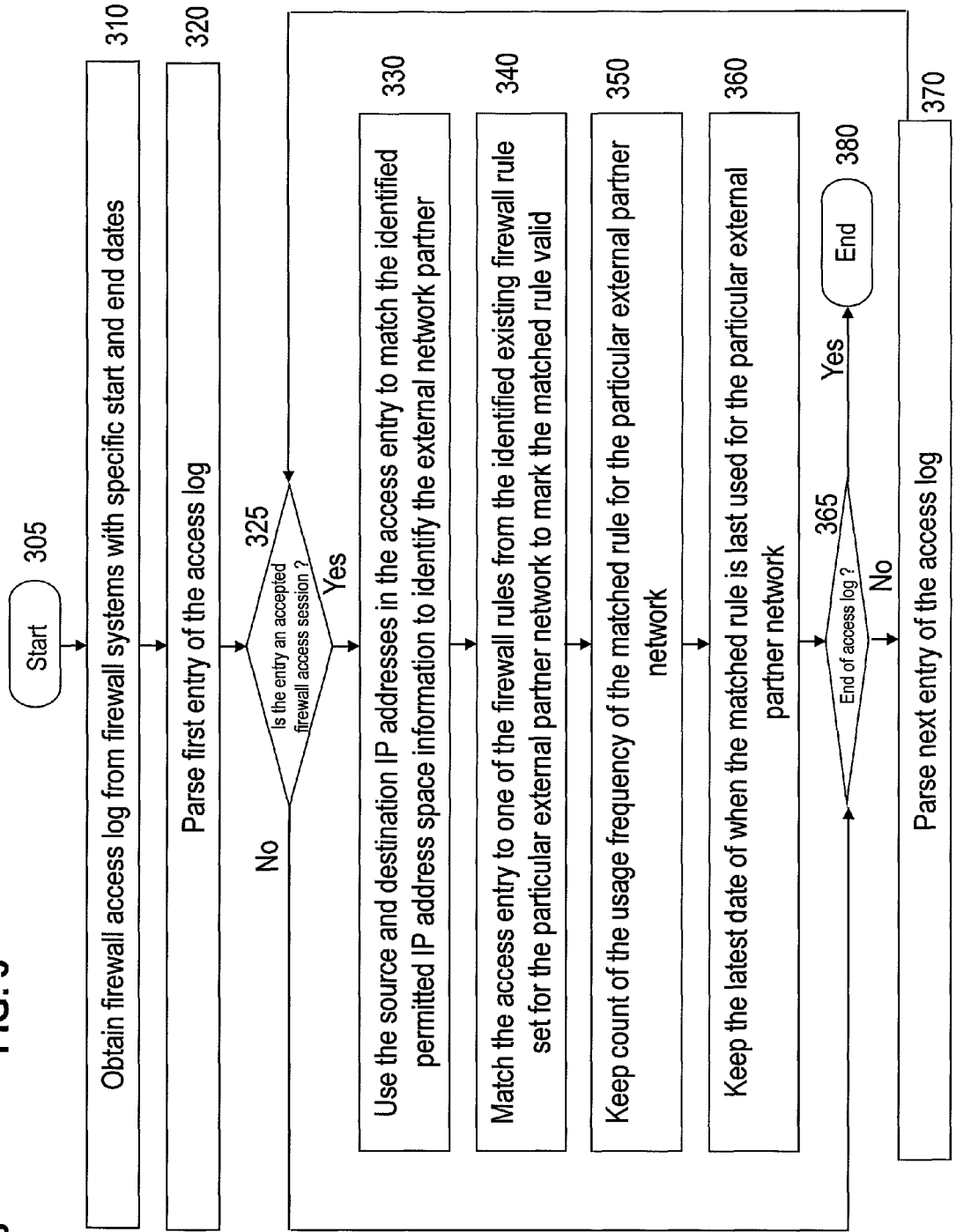
FIG. 3 illustrates a flowchart of a method for analyzing firewall system access logs to enable firewall rule reduction of the present invention.

FIG. 3 illustrates a flowchart of an exemplary method for analyzing firewall system access logs to enable firewall rule reduction. Method 300 starts in step 305 and proceeds to step 310.

In step 310, the method obtains the firewall system access logs with a specified start date and a specified end date for analysis.

In step 320, the method parses the first entry of the access log.

In step 325, the method checks if the entry represents an accepted firewall access session. An accepted session corresponds to packets associated with the session that are allowed to flow through the firewall system and a rejected session corresponds to packets associated with the session that are not allowed to flow through the firewall system. If the entry represents an accepted firewall access session, the method proceeds to step 330; otherwise, the method proceeds to step 365.

In step 330, the method uses the source and destination IP addresses in the access log entry to match against the identified permitted IP address space set produced in method 200 to identify the external network partner that the session is associated with. Special index tables for partner routable addresses and firewall rules are employed to accelerate the matching process.

In step 340, the method matches the access entry to one of the firewall rules in the identified existing firewall rule set produced in method 200 for the particular external partner network and then marks the matched rule as a valid firewall rule.

In step 350, the method keeps a count of the usage frequency of the matched rule for the particular external partner network.

In step 360, the method keeps the latest date when the matched rule is last used for the particular external partner network.

In step 365, the method checks if the current access log entry is the last entry in the log. If the entry is the last entry in the log, the method proceeds to step 380; otherwise, the method proceeds to step 370.

In step 370, the method parses the next entry in the firewall access log and proceeds back to step 325. The method ends in step 380.

Once method 300 is executed, it produces an output that identifies all existing firewall rules that have been used recently and marked valid on a per external partner network basis. Therefore, for the existing firewall rules of each external partner network that have not been marked valid, they are considered obsolete or unused rules. In one embodiment, it is reasonable to assume that an unused rule for a predefined period of time, e.g., 90 days or more should be removed. The length of the unused period of time threshold of an unused rule is a configurable parameter set by the network operator.

The output also produces the access count for each valid rule for each external partner network. The access count for each individual rule can be used as a reference for the activities associated to the rule as well as the placing order of the rule in the firewall configuration and security policy files for performance enhancement. For instance, more frequently used firewall rule should be placed at a higher position in the firewall access list in the firewall configuration and security policy files to reduce overall parsing time during normal operations of the firewall system.

Figure 4:
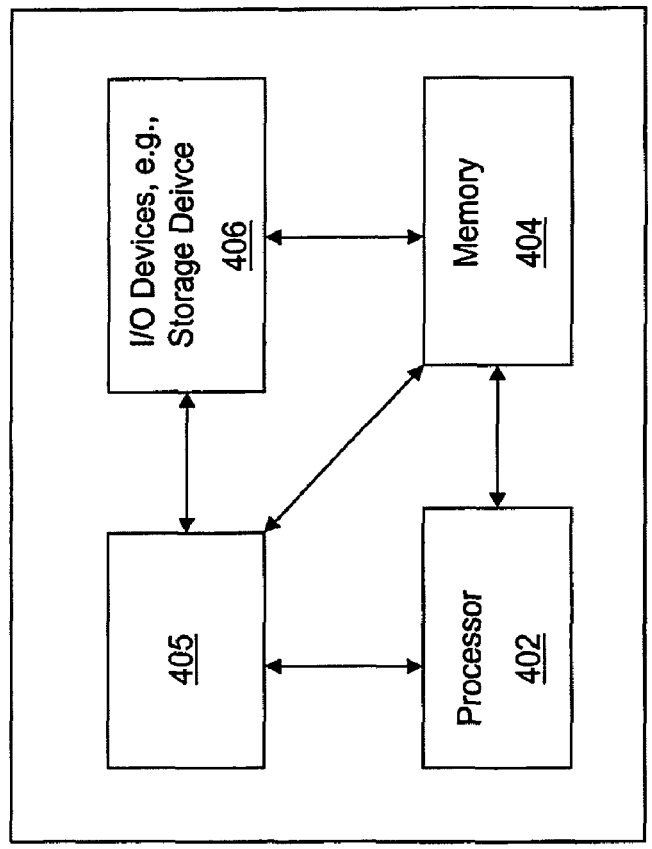
FIG. 4 illustrates a high level block diagram of a general purpose computer suitable for use in performing the functions described herein.

FIG. 4 depicts a high level block diagram of a general purpose computer suitable for use in performing the functions described herein. As depicted in FIG. 4, the system 400 comprises a processor element 402 (e.g., a CPU), a memory 404, e.g., random access memory (RAM) and/or read only memory (ROM), a firewall rules reduction module 405, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present firewall rules reduction module or process 405 can be loaded into memory 404 and executed by processor 402 to implement the functions as discussed above. As such, the present firewall rules reduction process 405 (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for reducing firewall rules in a communication network, comprising:
    identifying a plurality of existing firewall rules on a per external partner network basis;
    identifying a permitted internet protocol address space on a per external partner network basis; and
    analyzing, via a processor, an entry of a firewall access log to identify an unused firewall rule, wherein the analyzing further comprises:
        keeping a count of usage frequency of a firewall rule from the plurality of existing firewall rules that matches an accepted session, wherein the count of usage frequency is used as a placing order of the firewall rule in a firewall configuration file, wherein the placing order places a more frequently used firewall rule at a higher position in a firewall access list in the firewall configuration file.

2. The method of claim 1, wherein the communication network is an internet protocol network.

3. A non-transitory computer-readable medium having stored thereon a plurality of instructions, the plurality of instructions including instructions which, when executed by a processor, cause the processor to perform a method for reducing firewall rules in a communication network, comprising:

identifying a plurality of existing firewall rules on a per external partner network basis;
identifying a permitted internet protocol address space on a per external partner network basis; and
analyzing, via a processor, an entry of a firewall access log to identify an unused firewall rule, wherein the analyzing further comprises:
keeping a count of usage frequency of a firewall rule from the plurality of existing firewall rules that matches an accepted session, wherein the count of usage frequency is used as a placing order of the firewall rule in a firewall configuration file, wherein the placing order places a more frequently used firewall rule at a higher position in a firewall access list in the firewall configuration file.

4. The non-transitory computer-readable medium of claim 3, wherein the communication network is an internet protocol network.

5. An apparatus for reducing firewall rules in a communication network, comprising:
means for identifying a plurality of existing firewall rules on a per external partner network basis;
means for identifying a permitted internet protocol address space on a per external partner network basis; and
means for analyzing, via a processor, an entry of a firewall access log to identify an unused firewall rule, wherein the means for analyzing further comprises:
means for keeping a count of usage frequency of a firewall rule from the plurality of existing firewall rules that matches an accepted session, wherein the count of usage frequency is used as a placing order of the firewall rule in a firewall configuration file, wherein the placing order places a more frequently used firewall rule at a higher position in a firewall access list in the firewall configuration file.

6. The apparatus of claim 5, wherein the communication network is an internet protocol network.

* * * * *